(12) United States Patent
Iwahara et al.

(10) Patent No.: US 10,785,382 B2
(45) Date of Patent: Sep. 22, 2020

(54) PRINTING DEVICE, CONTROL METHOD OF A PRINTING DEVICE, AND STORAGE MEDIUM HAVING A WIRELESS COMMUNICATOR THAT IS PAIRED WITH AN EXTERNAL DEVICE

(71) Applicant: SEIKO EPSON CORPORATION, Tokyo (JP)

(72) Inventors: Yuma Iwahara, Shiojiri (JP); Hiroki Abe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/531,559

(22) Filed: Aug. 5, 2019

(65) Prior Publication Data

US 2019/0356813 A1    Nov. 21, 2019

Related U.S. Application Data

(63) Continuation of application No. 15/514,213, filed as application No. PCT/JP2015/000570 on Nov. 16, 2015, now Pat. No. 10,462,328.

(30) Foreign Application Priority Data

Dec. 4, 2014  (JP) .................................. 2014-245491
Dec. 4, 2014  (JP) .................................. 2014-245609
May 8, 2015  (JP) .................................. 2015-095707

(51) Int. Cl.
    *H04N 1/00*    (2006.01)
    *G06F 3/12*    (2006.01)
    (Continued)

(52) U.S. Cl.
    CPC .......... *H04N 1/32776* (2013.01); *B41J 29/38* (2013.01); *G06F 3/1204* (2013.01);
    (Continued)

(58) Field of Classification Search
    CPC .......... H04N 1/32776; H04N 1/33346; H04N 1/00204; H04N 1/4433; H04N 2201/0041;
    (Continued)

(56) References Cited

U.S. PATENT DOCUMENTS 7,154,619 B1    12/2006  Yoshida
2002/0061748 A1   5/2002  Nakakita et al.
(Continued)

FOREIGN PATENT DOCUMENTS

JP    2001-326964    11/2001
JP    2002-159053     5/2002
(Continued)

*Primary Examiner* — Juan M Guillermety
(74) *Attorney, Agent, or Firm* — Workman Nydegger

(57) ABSTRACT

A printing device has a print unit for printing on roll paper; a wireless communication unit for communicating wirelessly with a paired control device; and a controller for receiving print data by wireless communication from the control device, and controlling the print unit based on the received print data. When changing from a pairing-disabled mode to a pairing-enabled mode, the controller controls the print unit to print pairing-related information on roll paper, does not process pairing in the pairing-disabled mode, and processes pairing when a pairing request is received in the pairing-enabled mode.

13 Claims, 5 Drawing Sheets

(51) Int. Cl.
  *H04N 1/327* (2006.01)
  *B41J 29/38* (2006.01)
  *H04N 1/333* (2006.01)
  *H04N 1/44* (2006.01)

(52) U.S. Cl.
  CPC .......... *G06F 3/1236* (2013.01); *G06F 3/1292* (2013.01); *H04N 1/00204* (2013.01); *H04N 1/33346* (2013.01); *H04N 1/4433* (2013.01); *H04N 2201/0041* (2013.01); *H04N 2201/0055* (2013.01)

(58) Field of Classification Search
  CPC ............. H04N 2201/0055; B41J 29/38; G06F 3/1292; G06F 3/1236; G06F 3/1204; H04L 9/3073; H04W 12/00; H04W 12/003; H04W 12/00305
  See application file for complete search history.

(56) References Cited

U.S. PATENT DOCUMENTS

| | | | |
|---|---|---|---|
| 2004/0072580 A1 | 4/2004 | Honda | |
| 2005/0014503 A1 | 1/2005 | Nakakita et al. | |
| 2006/0111097 A1 | 5/2006 | Fujii | |
| 2007/0201389 A1 | 8/2007 | Murayama | |
| 2009/0064198 A1 | 3/2009 | Kobayashi | |
| 2010/0177720 A1 | 7/2010 | Sugaya | |
| 2011/0081860 A1 | 4/2011 | Brown | |
| 2011/0106954 A1 | 5/2011 | Chatterjee | |
| 2011/0185183 A1 | 7/2011 | Yamamoto | |
| 2011/0292975 A1 | 12/2011 | Kuwahara | |
| 2011/0320611 A1 | 12/2011 | Inada | |
| 2012/0023214 A1* | 1/2012 | Leeds | H04L 41/0806 709/223 |
| 2012/0069792 A1 | 3/2012 | Kishida | |
| 2012/0274962 A1* | 11/2012 | Thomas | H04N 1/00307 358/1.12 |
| 2013/0120597 A1 | 5/2013 | Sakai | |
| 2013/0141746 A1 | 6/2013 | Miller et al. | |
| 2013/0278122 A1* | 10/2013 | Edwards | G06K 7/01 312/237 |
| 2013/0321864 A1* | 12/2013 | Jintsugawa | G06F 3/1292 358/1.15 |
| 2014/0071471 A1* | 3/2014 | Tredoux | G06F 3/1292 358/1.13 |
| 2014/0096212 A1 | 4/2014 | Smith | |
| 2014/0211281 A1* | 7/2014 | Ishikawa | H04N 1/00127 358/498 |
| 2014/0355048 A1* | 12/2014 | Kang | G06F 3/1292 358/1.15 |
| 2014/0359751 A1 | 12/2014 | Son | |
| 2014/0368856 A1* | 12/2014 | Yoon | G06F 1/3284 358/1.13 |
| 2015/0002892 A1* | 1/2015 | Maeda | G06F 3/1292 358/1.15 |
| 2015/0055166 A1* | 2/2015 | Tachibana | H04N 1/00477 358/1.14 |
| 2015/0168906 A1* | 6/2015 | Ishii | G03G 15/70 399/21 |
| 2015/0170011 A1* | 6/2015 | Hattori | G06F 3/1282 358/1.6 |
| 2015/0188891 A1 | 7/2015 | Grange | |
| 2015/0382195 A1 | 12/2015 | Grim | |
| 2016/0127600 A1 | 5/2016 | Beatty | |
| 2016/0277873 A1* | 9/2016 | Park | H04W 76/14 |
| 2017/0012964 A1 | 1/2017 | Ceppi | |
| 2017/0134609 A1 | 5/2017 | Park | |

FOREIGN PATENT DOCUMENTS

| | | |
|---|---|---|
| JP | 2005-217646 | 8/2005 |
| JP | 2007-228419 | 9/2007 |
| JP | 2012-209758 | 10/2012 |
| KR | 2014-0088209 | 7/2014 |

* cited by examiner

PRINTING DEVICE, CONTROL METHOD OF A PRINTING DEVICE, AND STORAGE MEDIUM HAVING A WIRELESS COMMUNICATOR THAT IS PAIRED WITH AN EXTERNAL DEVICE

This application is a Continuation of U.S. patent application Ser. No. 15/514,213, filed on Mar. 24, 2017, which claims priority under 35 U.S.C. § 119 to Japanese Patent Application No. 2014-245491 filed on Dec. 4, 2014, No. 2014-245609 filed on Dec. 4, 2014, and No. 2015-095707 filed on May 8, 2015, and under 35 U.S.C. § 365 to PCT/JP2015/005707 filed on Nov. 16, 2015. The entire disclosures of which are expressly incorporated by reference herein.

TECHNICAL FIELD

The invention relates to a printing device, a control method of a printing device, and a storage medium.

BACKGROUND

Systems in which devices communicate by short range radio communication after pairing of one device and another device are known from the literature (see, for example, PTL 1).

CITATION LIST

Patent Literature

JP-A-2012-209758

SUMMARY

When a printing device with ability to print on a recording medium pairs with an external device so that the devices can communicate wirelessly, there is a need to make pairing easy and improve user convenience even when the printing device is a device that does not have a display device for displaying information by text or images on an LCD panel, for example.

The invention is directed to the foregoing problem, and an objective of the invention is to provide a printing device that simplifies pairing, a control method of the printing device, and a storage medium.

SOLUTION TO PROBLEM

To achieve the foregoing objective, a printing device according to at least one embodiment of the invention has a print unit (a print mechanism) configured to print on a recording medium; a wireless communication unit (a wireless communicator) configured to communicate wirelessly with a paired external device; and a control unit (a controller) configured to receive print data by wireless communication from the external device, and control the print unit based on the received print data, the control unit controlling the print unit to print pairing-related information on the recording medium when changing from a first mode to a second mode, not pairing in the first mode, and in the second mode pairing when there is a pairing request.

This configuration of at least one embodiment of the invention simplifies pairing between a printing device and an external device.

The printing device of at least one embodiment of the invention is also characterized by the control unit changing to the first mode when a specific time has passed after changing to the second mode.

This configuration enables secure pairing between the printing device and external device.

The printing device of at least one embodiment of the invention is also characterized by the control unit changing from the first mode to the second mode when a specific condition is met.

This configuration enables secure pairing between the printing device and external device.

The printing device of at least one embodiment of the invention is also characterized by the control unit determining if printing with the print unit is possible when the specific condition is met, and changing from the first mode to the second mode if printing is possible.

This configuration enables secure pairing between the printing device and external device.

The printing device of at least one embodiment of the invention is also characterized by the specific condition being that a specific operation was performed.

This configuration enables secure pairing between the printing device and external device.

The printing device of at least one embodiment of the invention is also characterized by the specific operation including a combination of an operation opening and closing a cover, and an operation of operating an operating switch.

This configuration enables secure pairing between the printing device and external device.

The printing device of at least one embodiment of the invention is also characterized by the specific condition being the power of the printing device turning on.

This configuration enables changing to the second mode when the printing device turns on.

The printing device of at least one embodiment of the invention is also characterized by the control unit determining if printing with the print unit is possible when a pairing request is received in the second mode, and pairing in response to the pairing request if printing is possible.

This configuration can prevent the printing device from pairing when the printing device cannot print with the print unit.

The printing device of at least one embodiment of the invention is also characterized by being able to change the pairing authentication method in the second mode.

This configuration can change the authentication method used for authentication during pairing according to the authentication methods used by the devices for pairing, and can change the authentication method according to the level of security required.

The printing device of at least one embodiment of the invention is also characterized by being able to change the method of not pairing in the first mode.

This configuration enables not pairing by a method appropriate to the environment in which the printing device is used.

To achieve the foregoing objective, another aspect of the invention is a control method of a printing device having a print unit that prints on a recording medium, and a wireless communication unit that communicates wirelessly with a paired external device, the control method including: printing pairing-related information on the recording medium with the print unit when changing from a first mode not pairing with the external device to a second mode for pairing with the external device in response to a pairing request from the external device; and when print data is received by the wireless communication unit by wireless communication from the external device after pairing in the second mode, printing on the recording medium with the print unit based on the received print data.

This configuration of at least one embodiment of the invention simplifies pairing between a printing device and an external device.

To achieve the foregoing objective, another aspect of the invention is a storage medium storing a program causing the control unit of a printing device having a print unit that prints on a recording medium, and a wireless communication unit that communicates wirelessly with a paired external device, to: print pairing-related information on the recording medium with the print unit when changing from a first mode not pairing with the external device to a second mode for pairing with the external device in response to a pairing request from the external device; and when print data is received by the wireless communication unit by wireless communication from the external device after pairing in the second mode, print on the recording medium with the print unit based on the received print data.

This configuration of at least one embodiment of the invention simplifies pairing between a printing device and an external device.

DESCRIPTION OF EMBODIMENTS

An embodiment of the invention is described below with reference to the accompanying figures.

Figure 1:
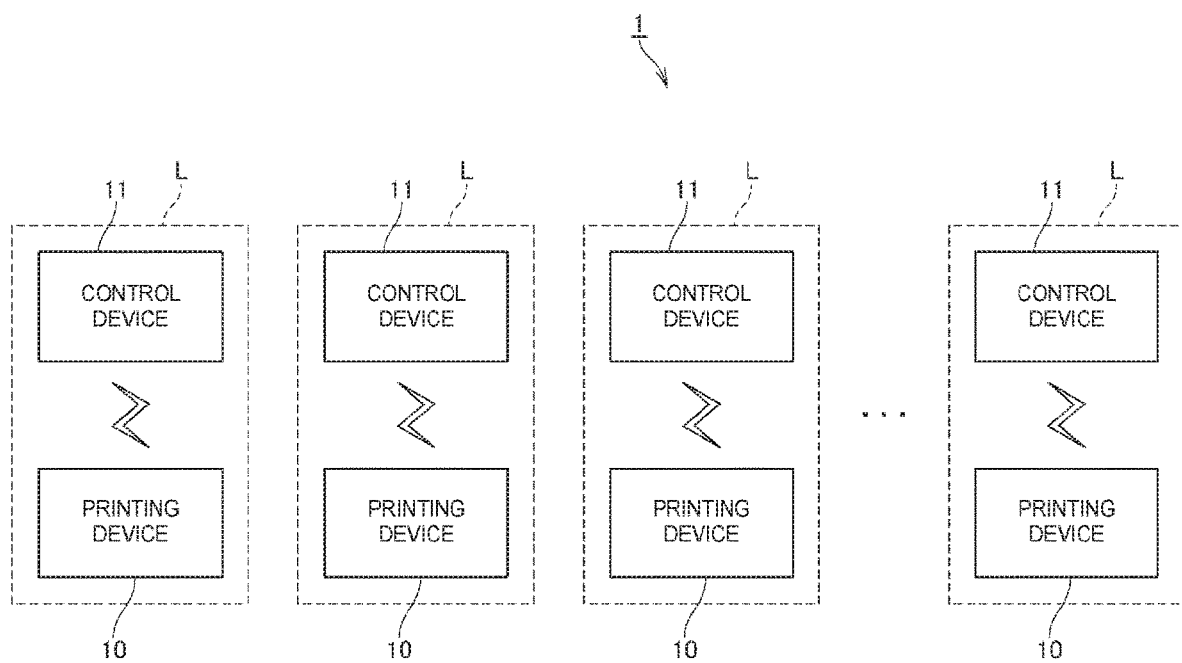
FIG. 1 illustrates a printing system according to an embodiment of the invention.

FIG. 1 illustrates a printing system 1 according to this embodiment.

The printing system 1 is a system used in shopping centers, retail stores such as department stores and convenience stores, and food service businesses such as restaurants, cafes, and bars.

The printing system 1 has functions for processing transactions according to the products a customer purchases, and functions for issuing receipts according to the transactions.

Checkout counters L where customer transactions are processed are provided in a store where the printing system 1 is deployed. A printing device 10 capable of producing receipts according to the transactions is disposed at each checkout counter L. A control device 11 (external device) is provided to the checkout clerk that processes the transaction at each checkout counter L.

The control device 11 is a tablet (flat) computer having a touch panel 31 on the front.

The printing device 10 and the control device 11 assigned to each checkout clerk are previously paired using the Bluetooth (R) protocol.

To process transactions at the checkout counter L, the checkout clerk first wirelessly connects the control device 11 assigned to the clerk to the printing device 10 by Bluetooth, and starts a dedicated application (referred to below as the dedicated application AP) previously installed on the control device 11.

The dedicated application AP provides a specific user interface to the checkout clerk for processing transactions at the checkout counter L.

The checkout clerk inputs information according to the transaction through the user interface, and reads transaction-related information displayed on the user interface.

When processing a transaction at the checkout counter L, the control device 11 controls the printing device 10 through functions of the dedicated application AP to produce a receipt. The receipt produced by the printing device 10 is then given to the customer.

Note that a wireless connection in this example means that a Bluetooth communication link is established between the printing device 10 and control device 11, and the devices can send and receive data through the communication link.

Figure 2:
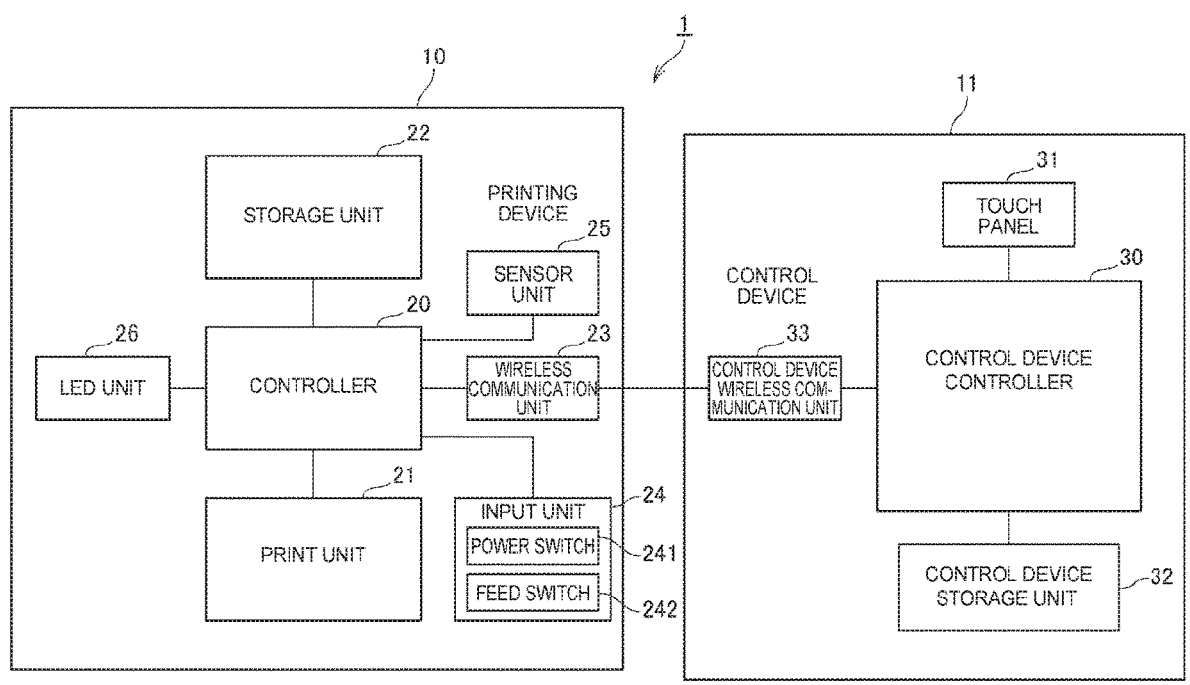
FIG. 2 is a block diagram illustrating the functional configuration of the printing device and control device.

FIG. 2 is a block diagram illustrating the functional configuration of the printing device 10 and the control device 11.

As shown in FIG. 2, the printing device 10 is a thermal line printer that stores roll paper (recording media) and prints images by forming dots on the roll paper by a thermal line head.

As shown in FIG. 2, the printing device 10 includes a controller 20, print unit 21, storage unit 22 (storage 22), wireless communication unit 23, input unit 24 (input 24), sensor unit 25 (sensor 25), and LED unit 26 (LED 26).

The controller 20 comprises a CPU, ROM, RAM, and other peripheral circuits, and controls the printing device 10. The controller 20 controls the printing device 10 by reading and running an installed control program such as firmware.

The print unit 21 has a conveyance mechanism for conveying the roll paper stored inside the cabinet of the printing device 10, a print mechanism for printing images by forming dots on the roll paper by the thermal head, and a cutter mechanism for cutting the roll paper at a specific position. The print unit 21 prints images on the roll paper by the print mechanism while conveying the roll paper by the conveyance mechanism, and then cuts the roll paper at a specific position by the cutter mechanism, producing a receipt.

The storage unit 22 comprises a storage medium such as nonvolatile memory, and stores data.

The storage unit 22 stores firmware or other control program (program), and the controller 20 executes processes such as described below by reading and running the control program stored by the storage unit 22 (storage medium).

The wireless communication unit 23 has a wireless communication module including a link manager, link controller, high frequency circuit, and antenna, and establishes a communication link with the control device 11 and communicates wirelessly by Bluetooth as controlled by the controller 20.

The input unit 24 includes a power switch 241 for turning device power on/off, a feed switch 242 for conveying the roll paper, and other operating switches. The input unit 24 detects operation of the operating switches and outputs to the controller 20. The controller 20 then executes processes appropriate to the operation of the operating switch based on the input from the input unit 24.

The sensor unit 25 includes multiple sensors and a converter that A/D converts the detection values from the sensors, and outputs the detection values of the sensors to the controller 20.

The sensors include a sensor for detecting if a cover not shown disposed to the printing device 10 is open or closed; a position detection sensor for detecting the position of the roll paper; sensors for detecting errors related to roll paper conveyance, errors related to the print mechanism, and other errors; a sensor for detecting the position of the cutter of the cutter mechanism; a sensor for detecting the temperature of the thermal head of the print mechanism; and a sensor for detecting if the roll paper has run out.

Based on input from the sensor unit 25, the controller 20 detects the state of the printing device 10.

The LED unit 26 has one or more LEDs, and causes the LEDs to turn on/off in a specific pattern as controlled by the controller 20.

The control device 11 is a tablet computer.

As shown in FIG. 2, the control device 11 includes a control device controller 30, touch panel 31, control device storage unit 32 (control device storage 32), and control device wireless communication unit 33 (control device wireless communicator 33).

The control device controller 30 comprises a CPU, ROM, RAM, and other peripheral circuits, and controls the control device 11.

The touch panel 31 includes a display panel such as an LCD panel, and a touch sensor disposed over the display panel. The display panel displays images as controlled by the control device controller 30. The touch sensor detects touch operations and outputs to the control device controller 30. The control device controller 30 executes processes appropriate to the touch operations based on input from the touch panel 31.

The control device storage unit 32 has nonvolatile memory and stores data.

The control device wireless communication unit 33 has a wireless communication module, and establishes a communication link with the printing device 10 and communicates wirelessly by Bluetooth as controlled by the control device controller 30.

Operation of the control device 11 and printing device 10 when producing a receipt is described next.

In this operation the printing device 10 and control device 11 are already paired and a wireless connection is open between the devices (a communication link is established). The dedicated application AP on the control device 11 has started, and the user interface provided by the dedicated application AP is displayed on the touch panel 31.

The process of the control device controller 30 described below is executed by functions of control programs including the dedicated application AP, an API (Application Programming Interface) that can be read by the dedicated application AP, and the operating system of the control device 11.

The control device controller 30 of the control device 11 generates print data instructing producing a receipt when operation of a touch button instructing producing a receipt is detected after transaction-related information is input to the user interface provided by the dedicated application AP. The print data is control data comprising control commands in the command language of the printing device 10.

Next, the control device controller 30 controls the control device wireless communication unit 33 to send the generated print data to the printing device 10.

The controller 20 of the printing device 10 controls the wireless communication unit 23 to receive the print data the control device 11 sent.

Next, the controller 20 controls the print unit 21 to produce a receipt based on the received print data.

As described above, a paired control device 11 is wirelessly connected to the printing device 10, and processes including producing receipts are executed as controlled by the wirelessly connected control device 11.

Freely pairing the printing device 10 with terminals other than the control device 11 assigned to the checkout clerk, that is, pairing with a terminal the printing device 10 is not permitted to communicate with, is not appropriate. This is because, for example, a third party with bad intentions could connect to the printing device 10 and take over control of the printing device 10, or cause the printing device 10 to print unanticipated information.

Pairing generally involves authentication using a passkey of a specific number of values. However, passkeys are often simple values to simplify management, and authentication using a passkey may not be able to effectively prevent pairing with a terminal other than the control device 11.

Methods that do not use a passkey have been proposed as authentication methods for authentication when pairing, and when such authentication methods are used for pairing, devices that are not permitted to communicate with the printing device 10 can easily pair with the printing device 10.

A printing device 10 according to this embodiment of the invention and the control device 11 therefore execute the process described below when pairing.

Figure 3:
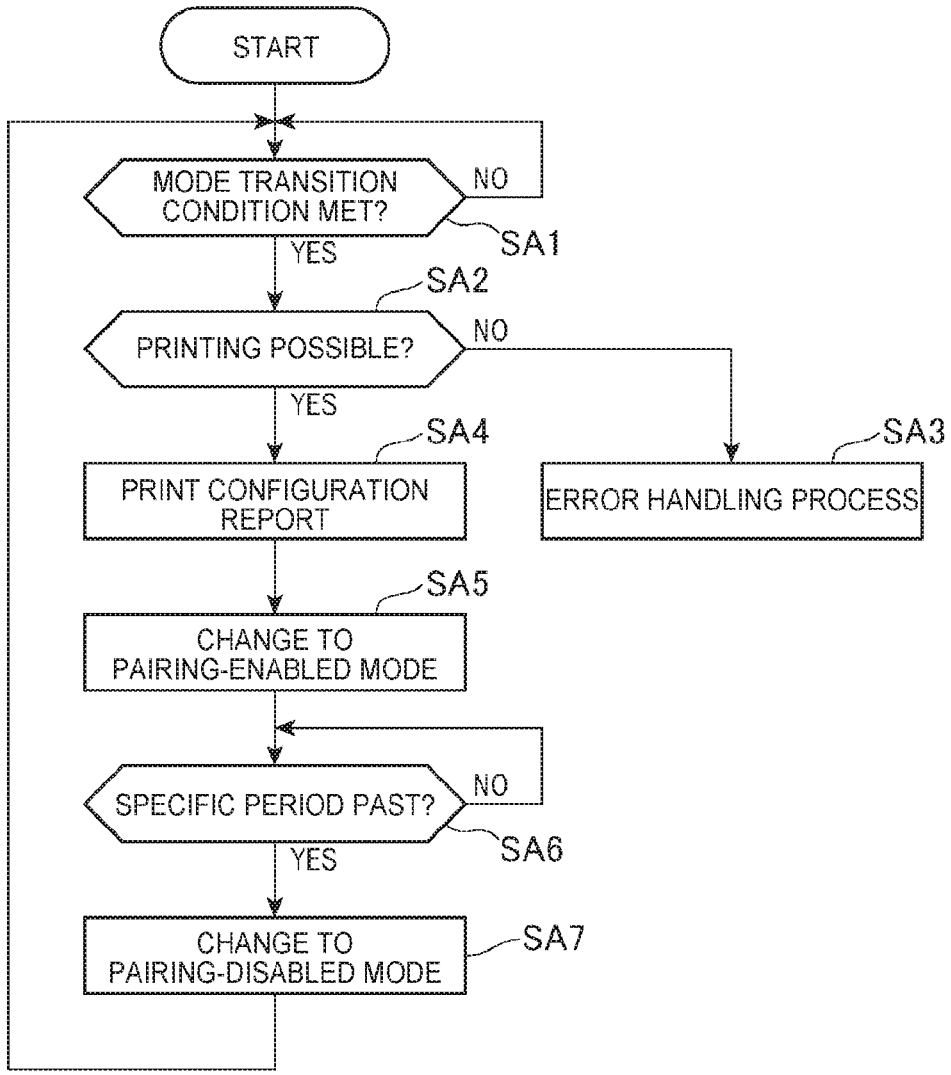
FIG. 3 is a flow chart of an operation of the printing device.

FIG. 3 is a flow chart of the operation of the printing device 10 when pairing.

Note that when the operation described in FIG. 3 starts, the operating mode of the printing device 10 is set to a pairing-disabled mode (first mode).

As shown in FIG. 3, the controller 20 of the printing device 10 monitors if a condition (referred to below as a mode transition condition) that triggers changing to a pairing-enabled mode (second mode) is met (step SA1).

The pairing-enabled mode is a mode allowing pairing between the printing device 10 and control device 11. When the printing device 10 is in the pairing-enabled mode, the printing device 10 pairs with the control device 11 in response to a request from the control device 11.

The mode transition condition is that a specific operation was performed on the printing device 10. In this embodiment, the specific operation is that the feed switch 242 is operated when a cover on the printing device 10 is open, and the cover is closed while the feed switch 242 is still being operated. The controller 20 detects if this operation is performed based on input from the input unit 24 and input from the sensor unit 25.

Note that the specific operation is not limited to the foregoing. For example, the specific operation may be that the feed switch 242 is operated in a specific way (such as operated five times within two seconds), that the position of the cutter moves while the feed switch 242 is operated, or that the cover is opened and closed in a specific way (such as opened and closed four times in three seconds). More specifically, the specific operation is an operation that the user must perform intentionally. Such an operation can prevent unintentionally entering the pairing-enabled mode due to accidentally performing the specific operation.

The mode transition condition may also be the power turning on. By using this as the mode transition condition, the pairing-enabled mode can be entered when the device turns on. As will be understood below, changing to the pairing-enabled mode happens at a specific time. In general, the printing device 10 is turned on by a specific person when the store opens for business. Pairing is therefore not made less secure even if the power turning on is used as the mode transition condition.

If the mode transition condition is met (step SA1: YES), the controller 20 determines if printing is possible based on input from the sensor unit 25 (step SA2).

For example, printing is not possible if an error has occurred in the conveyance mechanism or print mechanism, if there is no paper, if a cover is open, or if an error has occurred in the receive buffer storing received data.

If printing is not possible (step SA2: NO), the controller 20 executes an error handling process (step SA3).

For example, the controller 20 may control the LED unit 26 to drive an LED on/off in a specific pattern to report that printing is not possible and the pairing-enabled mode will not be entered. As a result, the user can know that printing is not possible, and based thereon, can take appropriate action, such as resolving the error in the printing device 10.

If printing is possible (step SA2: YES), the controller 20 controls the print unit 21 to print pairing-related information in a configuration report (step SA4). The pairing-related information includes the BD (Bluetooth device) address, the device name of the printing device 10, the passkey used for authentication during pairing, a 2D code representing the passkey, and information indicating the period of the pairing-enabled mode.

Note that as described below the controller 20 sets the operating mode to the pairing-enabled mode for a specific period starting from a specific time. The information indicating the period of the pairing-enabled mode printed on the configuration report may contain only information indicating when the period starts and information indicating the specific period. For example, if the pairing-enabled mode is entered when printing the configuration report ends and the specific period is two minutes, the information indicating the period of the pairing-enabled mode may be a statement such as "pairing is enabled for 2 minutes after printing this report ends."

Note that the pairing-related information printed on the configuration report is not limited to the foregoing information, only part of the foregoing information may be printed, other information may be printed in addition to the foregoing information, or other information may be printed instead of the foregoing information.

The user acquires the pairing-related information by referring to the pairing-related information printed on the configuration report.

The controller 20 goes to the pairing-enabled mode when the configuration report is printed (step SA5). While the operating mode is set to the pairing-enabled mode, the printing device 10 processes pairing between the printing device 10 and control device 11 in response to a request from the control device 11.

Note that the pairing-enabled mode may be entered in step SA5 when printing the configuration report starts (timed to the start of printing the configuration report plus a specific margin). The pairing-enabled mode may also be entered in step SA5 when printing the configuration report ends (timed to the end of printing the configuration report plus a specific margin). More specifically, the process of step SA5 does not need to wait until the process of step SA4 ends, and the process of step SA4 and the process of step SA5 may execute simultaneously in part. However, if changing to the pairing-enabled mode starts when printing the configuration report ends, user convenience is improved because changing to the pairing-enabled mode occurs after the user is able to read the information (information including information used for pairing) printed on the configuration report.

The controller 20 of the printing device 10 according to this embodiment thus controls the print unit 21 to print pairing-related information on roll paper (recording media) when changing from the pairing-disabled mode (first mode) to the pairing-enabled mode (second mode).

This embodiment of the invention prints a configuration report in response to changing to the pairing-enabled mode. As a result, the user can know that the pairing-enabled mode was entered by seeing that the configuration report was printed, and can know to perform the pairing operation within the specified time in order to complete pairing.

During the specific period after changing to the pairing-enabled mode, an LED is also driven on/off in a specific pattern so that the user can know that the printer is in the pairing-enabled mode.

Furthermore, if the mode transition condition is met but printing is not possible, this embodiment of the invention does not change to the pairing-enabled mode. This is for the following reason.

Specifically, this is because when printing is not possible the printing device 10 cannot print the configuration report, and the user cannot know the pairing-enabled mode was entered and cannot get the information required for pairing.

Using its ability to print, the printing device 10 in this embodiment of the invention prints a configuration report based on changing to the pairing-enabled mode, and user convenience can thereby be improved, but executes an appropriate handling process in situations in which printing is not possible and the configuration report cannot be output.

Pairing when the operating mode is set to the pairing-enabled mode is described further below.

After entering the pairing-enabled mode, the controller 20 monitors if the specific period has passed (step SA6).

If the specific period has passed (step SA6: YES), the controller 20 changes from the pairing-enabled mode to the pairing-disabled mode.

While the operating mode is set to the pairing-disabled mode, the controller 20 does not process pairing. How the controller 20 does not process pairing when the operating mode is set to the pairing-disabled mode is described further below.

In this embodiment as described above, pairing is possible for a specific period of time after the mode transition condition is met, and pairing is not possible outside of this specific period of time. In addition, the mode transition condition is that the user intentionally performs a specific operation, and a third party cannot intentionally cause the mode transition condition to be met.

As a result, pairing between a third-party terminal and the printing device 10 can be prevented.

Pairing while the operating mode is set to the pairing-enabled mode is described next.

The basic operation of the printing device 10 when the operating mode is set to the pairing-enabled mode is described first.

Figure 4:
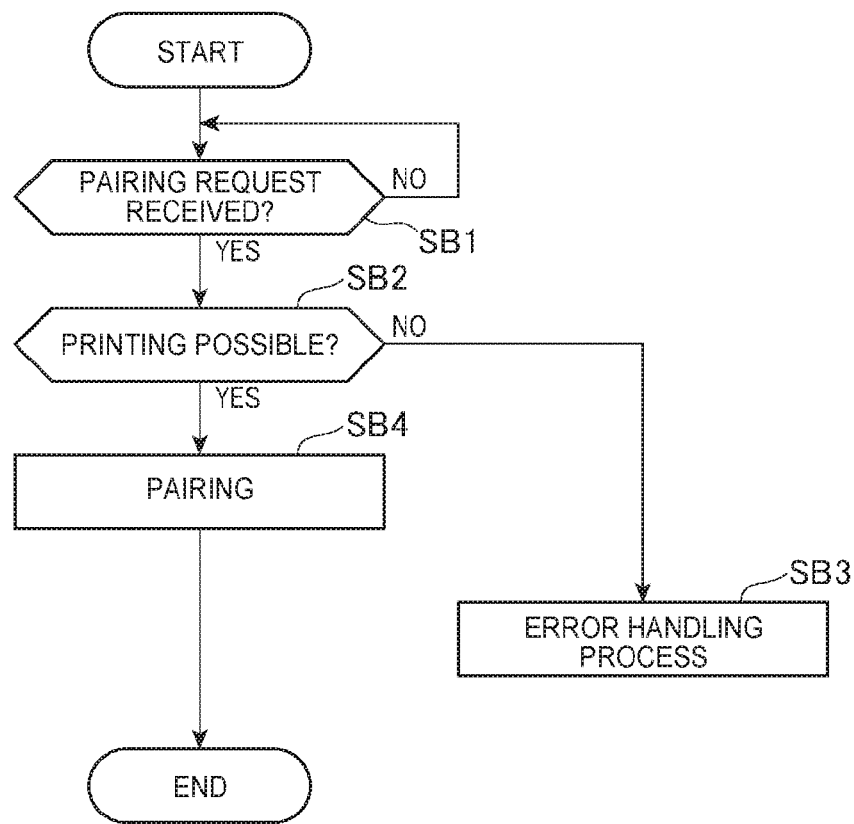
FIG. 4 is a flow chart of an operation of the printing device.

FIG. 4 is a flow chart of the basic operation of the printing device 10 when the operating mode is set to the pairing-enabled mode.

As shown in FIG. 4, the controller 20 of the printing device 10 monitors for a pairing request from an external device (including the control device 11) (step SB1).

If there is a pairing request (step SB1: YES), the controller 20 determines if the print unit 21 can print (step SB2).

If printing is not possible (step SB2: NO), the controller 20 executes an appropriate process (step SB3).

For example, the controller 20 may control the LED unit 26 to turn an LED on/off in a specific pattern to indicate that printing is not possible and pairing will not occur. As a result, the user can know that printing is not possible, and based thereon, can take appropriate action, such as resolving the error in the printing device 10.

If printing is possible (step SB2: YES), the controller 20 proceeds with pairing (step SB4). Note that depending on the authentication method in step SB4 pairing may fail depending on the result of authentication.

The printing device 10 in this embodiment of the invention thus does not pair even if the operating mode is set to the pairing-enabled mode if the print unit 21 cannot print. The reason for this is described below.

It is expected that when there is a pairing request, the external device (the control device 11 in this example) that requested pairing and the printing device 10 will connect wirelessly after pairing, and the printing device 10 will print as controlled by the control device 11. However, if the print unit 21 cannot print, the printing device 10 cannot normally execute processes based on control data received from the control device 11. In addition, if the control device 11 connects wirelessly to the printing device 10 when the printing device 10 cannot print with the print unit 21, the control device 11 must execute a process appropriate to the printing device 10 being unable to print (for example, receive an error report, respond to the error report, and report an error based on the error report), and the processing load of the control device 11 increases. Furthermore, if the printing device 10 cannot print as controlled by the control device 11 after the printing device 10 and control device 11 connect wirelessly, the user may erroneously think that the reason is because the devices did not pair correctly or were unable to connect wirelessly. In addition, by reporting that the print unit 21 is unable to print when a pairing request is received, the user can quickly be made aware that the print unit 21 cannot print before a wireless connection is actually opened between the printing device 10 and control device 11, and can quickly resolve the problem.

Based on the foregoing, when the print unit 21 cannot print, the printing device 10 does not pair in response to a pairing request, and as a result prompts resending a pairing request after the problem preventing printing is resolved.

This embodiment of the invention can change the authentication method used for pairing to any of three authentication methods, a first authentication method, a second authentication method, and a third authentication method. Because the authentication method can be changed, the authentication method can be changed according to the authentication methods the devices can use, and the authentication method can be changed according to the level of security required.

First Authentication Method

The first authentication method is an authentication method corresponding to the Just Works method of the SSP (Secure Simple Pairing) model.

In the first authentication method, when there is a pairing request from the control device 11, the controller 20 of the printing device 10 follows the steps in the corresponding protocol for pairing instead of using a passkey.

Because the first authentication method requires little user intervention for pairing, the burden on the user is low. In addition, because pairing is possible only during a limited time as described above, security is maintained in the pairing process.

Second Authentication Method

The second authentication method is an authentication method corresponding to the SSP Numeric Comparison method.

In the second authentication method, the printing device 10 and control device 11 execute the following process following the steps of the corresponding protocol. More specifically, the control device controller 30 of the control device 11 displays the passkey in a specific user interface, and causes the user to input whether or not the passkey is correct. If the user inputs to the control device 11 that the passkey is correct and confirmation is received from the control device 11, the controller 20 of the printing device 10 authenticates the control device 11, and the printing device 10 and control device 11 pair. Note that in this embodiment the printing device 10 does not display a passkey and receive input confirming if the passkey is correct, but may be configured to do so.

Because the user simply inputs whether or not the passkey displayed on the control device 11 is correct, the burden on the user in the second authentication method is low. Furthermore, because the passkey is printed in the configuration report that is printed when the printing device 10 changes to the pairing-enabled mode, the user can easily and reliably determine if the passkey displayed on the control device 11 is correct or not by referring to the configuration report.

Third Authentication Method

The third authentication method is an authentication method corresponding to the SSP Passkey Entry method.

Figure 5:
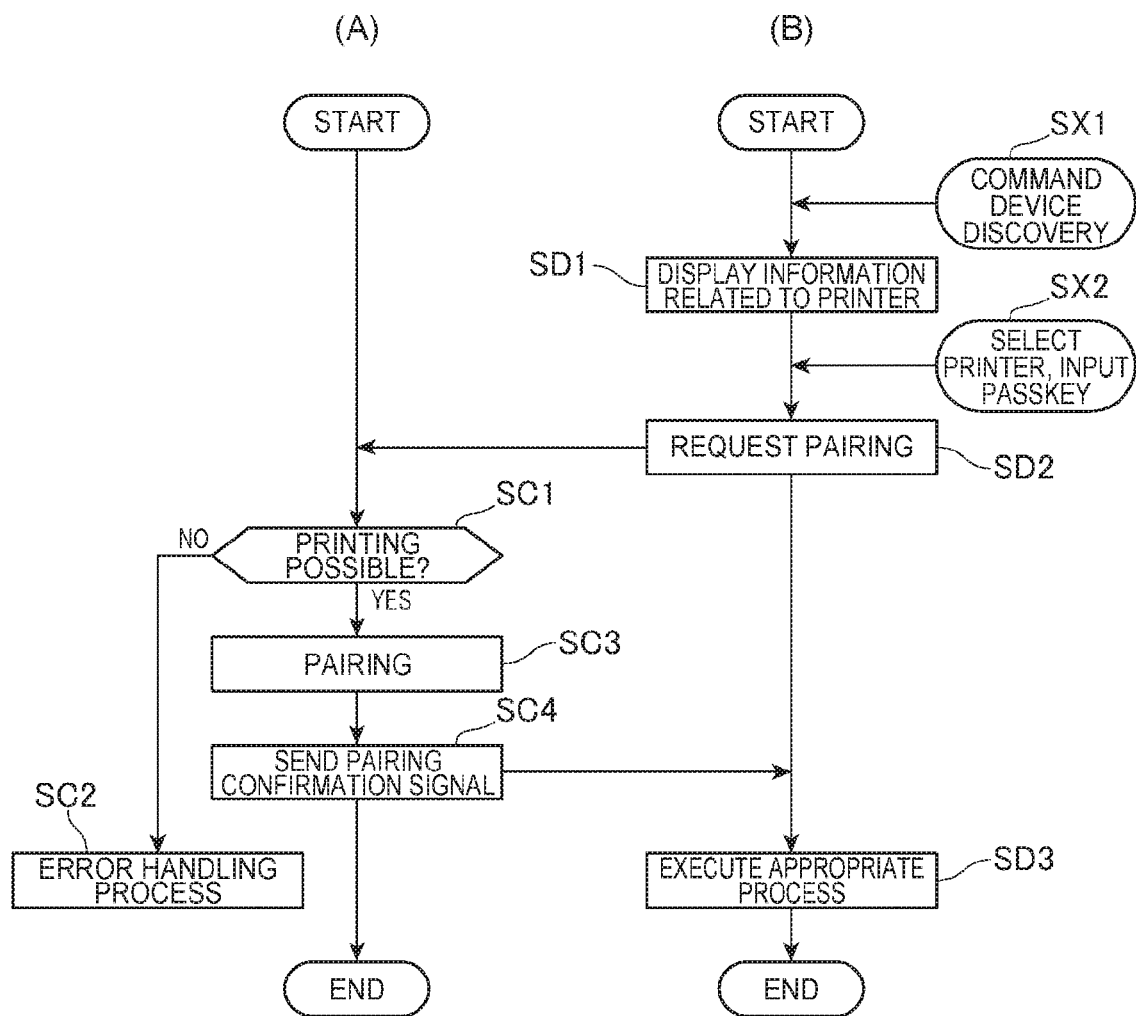
FIG. 5 is a flow chart of an operation of the printing device and control device.

FIG. 5 is a flow chart of the operation of the printing device 10 and control device 11 when using the third authentication method for authentication. Column (A) of FIG. 5 shows the operation of the printing device 10, and column (B) of FIG. 5 shows the operation of the control device 11.

As shown in column (B) of FIG. 5, the user operates the control device 11 to display a user interface related to Bluetooth settings, and commands discovering Bluetooth devices (step SX1).

In response to the command from step SX1, the control device controller 30 of the control device 11 discovers for the printing device 10 as a Bluetooth device, displays the device name of the printing device 10 in a selectable manner in the user interface, and presents an input field for the passkey corresponding to the device name (step SD1).

Discovering the printing device 10 is done by the printing device 10 receiving a discovery packet that is broadcast according to a specific Bluetooth protocol, and processing the packet according to the protocol.

The user selects the printing device 10 displayed in the user interface, and inputs the passkey to the corresponding field (step SX2).

Because the passkey is printed on the configuration report printed when the printing device 10 changes to the pairing-enabled mode, the user can easily and accurately identify the passkey to input by referring to the configuration report.

Note that the passkey may be input by reading a 2D code representing the passkey printed on the configuration report.

In response to the input of step SX2, the control device controller 30 of the control device 11 sends a pairing request signal (requests pairing) (step SD2).

Note that while not shown in the flow chart, in response to transmission of the pairing request signal by the control device 11, the printing device 10 and control device 11 communicate by an appropriate protocol and send and receive the required information.

As shown in column (A) of FIG. 5, in response to receiving a pairing request, the controller 20 of the printing device 10 determines if the print unit 21 can print (step SC1).

If the print unit 21 is not able to print (step SC1: YES), the controller 20 reports the same by a process of driving an LED, for example, without pairing (step SC2).

If the print unit 21 can print (step SC1: YES), the controller 20 proceeds with pairing using a passkey based on the received pairing request signal (step SC3).

Next, the controller 20 sends a pairing confirmation signal reporting the result of the pairing process (step SC4). The pairing confirmation signal is a signal indicating whether or not pairing was successful.

As shown in column (B) of FIG. 5, the control device controller 30 of the control device 11 executes a process appropriate to receiving the pairing confirmation signal (step SD3). For example, the control device controller 30 displays information indicating the success/failure of pairing in a user interface.

More secure pairing is possible with the third authentication method because passkey authentication is used for pairing.

Methods whereby the printing device 10 does not process pairing when the operating mode is set to the pairing-disabled mode is described next.

The method of not pairing in this embodiment can be changed to either a first method or a second method. Because the method can be changed, the method appropriate to the printing device 10 environment can be selected.

First Method

In the first method, the controller 20 of the printing device 10 does not broadcast a packet for discovering devices when the operating mode is set to the pairing-disabled mode.

With the first method, when the operating mode is set to the pairing-disabled mode, the control device 11 cannot discover the printing device 10 and cannot send a pairing request. As a result, pairing between a third-party terminal and the printing device 10 can be prevented when the pairing-disabled mode is the operating mode.

In addition, because a third party cannot recognize the printing device 10 as a Bluetooth device by looking for Bluetooth devices when the operating mode is set to the pairing-disabled mode, pairing by a third party can be more effectively prevented.

A configuration that does not process pairing and simply returns a pairing confirmation signal including information that pairing failed when a discover packet is broadcast and a pairing request is received from the control device 11 is also conceivable.

Second Method

In this second method, when the operating mode is set to the pairing-disabled mode, the controller 20 of the printing device 10 broadcasts a device discovery packet, but when a pairing request is received from an external device, returns a pairing confirmation signal containing information that pairing failed without processing pairing.

This second method enables an authorized person to know that the operating mode is set to the pairing-disabled mode when pairing is attempted but fails, and can perform the specific operation to change to the pairing-enabled mode and retry pairing.

As described above, a printing device 10 according to this embodiment has a print unit 21 for printing on roll paper (recording media); a wireless communication unit 23 for communicating wirelessly with a paired control device 11 (external device); and a controller 20 for receiving print data by wireless communication from the control device 11, and controlling the print unit 21 based on the received print data. When changing from a pairing-disabled mode (first mode) to a pairing-enabled mode (second mode), the controller 20 controls the print unit 21 to print pairing-related information on roll paper, does not process pairing in the pairing-disabled mode, and processes pairing when a pairing request is received in the pairing-enabled mode.

Because this configuration prints pairing-related information on roll paper when changing from the pairing-disabled mode (first mode) to the pairing-enabled mode (second mode), the user can refer to the information printed on roll paper and complete pairing easily. More specifically, pairing between the printing device 10 and control device 11 is simple.

When a specific period has passed after changing to the pairing-enabled mode, the controller 20 in this embodiment changes to the pairing-disabled mode.

Because this configuration enables pairing during the specific period and prevents pairing anytime outside this specific period, pairing can be limited to a specific time, and pairing is secure.

The controller 20 in this embodiment changes from the pairing-disabled mode to the pairing-enabled mode when a specific condition (mode transition condition) is met.

This configuration prevents a terminal of a third-party other than the user that knows the specific condition from pairing, and enables secure pairing.

When a specific condition is met in this embodiment, the controller 20 determines if printing with the print unit 21 is possible, and if possible, goes from the pairing-disabled mode to the pairing-enabled mode.

This configuration prevents pairing based on a pairing request when printing with the print unit 21 is not possible.

The specific condition in this embodiment is that a specific operation was performed.

This configuration prevents a terminal of a third-party other than the user that knows the specific condition from pairing, and enables secure pairing.

The specific condition in this embodiment may also be that an operation combining an operation of opening and closing a cover, and an operation of operating the feed switch 242, is performed.

This configuration uses the printing device 10 configuration having a cover and a feed switch 242 to prevent changing to the pairing-enabled mode unintentionally due to the specific operation being performed accidentally.

The specific condition in this embodiment may also be the device power turning on.

This configuration enables entering the pairing-enabled mode when the power turns on. As described above, the printing device 10 is generally turned on by a specific person when the store opens for business. Pairing is therefore not made less secure even if the power turning on is used as the mode transition condition.

When there is a pairing request in the pairing-enabled mode in this embodiment, the controller 20 determines if printing with the print unit 21 is possible, and if printing is possible processes pairing in response to the pairing request.

In this configuration the printing device 10 can prevent pairing when printing with the print unit 21 is not possible.

This embodiment can also change the authentication mode used for pairing in the pairing-enabled mode.

This configuration can change the authentication method used for authentication during pairing according to the authentication methods used by the devices for pairing, and can change the authentication method according to the level of security required.

This embodiment can also change the method used for not pairing in the pairing-disabled mode.

This configuration enables not pairing by a method appropriate to the environment in which the printing device 10 is used.

The invention is described above with reference to a preferred embodiment thereof, but the invention is not limited thereto and can be modified and adapted in many ways without departing from the scope of the accompanying claims.

For example, the printing system 1 is used in a store, and the printing device 10 prints receipts as controlled by the control device 11, in the embodiment described above. However, how the printing system 1 is used is not so limited. More specifically, the invention can be applied to any system in which the printing device 10 communicates wirelessly with a paired device, and the printing device 10 and control device 11 communicate wirelessly after pairing.

The printing device 10 in the foregoing embodiment is a thermal printer, but the printing method of the printing device 10 is not limited to thermal printing, and may use an inkjet or other type of printing method. The printing device 10 may also be a desktop-type device that is stationary on a counter, for example, or a mobile printer that is held by the user.

The function blocks described above with reference to the figures can be embodied as desired by the cooperation of hardware and software, and do not suggest a specific hardware configuration.

As described above, the invention is useful as a pairing method for pairing a device with a print capability and an external device, and is particularly useful as a pairing method that enables easily pairing devices.

REFERENCE SIGNS LIST

1 printing system
10 printing device
11 control device (external device)
20 controller
21 print unit
23 wireless communication unit

The invention claimed is:

1. A printing system comprising:
a printer and a terminal, the printer including:
   a conveyance mechanism configured to convey a paper of a roller paper;
   a print mechanism configured to print on the paper of the roll paper;
   an operating switch including a feed switch for conveying the paper of the roll paper; and
   a wireless communicator configured to communicate wirelessly with the terminal paired with the printer based on Bluetooth;
the terminal including a touch panel configured to display a user interface related to Bluetooth settings;
wherein,
   the terminal is configured to:
      display a device name of the printer in a selectable manner in the user interface; and
      display, based on Numeric Comparison method, a passkey including a specific number of values for pairing with the printer based on Bluetooth in a specific user interface when receiving a selection of the device name of the printer; and
   the printer is configured to:
      print pairing-related information including the passkey on the paper of the roll paper if printing by the print mechanism is possible when displaying, by the terminal, the passkey in the specific user interface after turning the printer power on;
      pair with the terminal when receiving, by the terminal, user input in the specific user interface during a specific time period after printing the pairing-related information on the paper of the roll paper, and/or when receiving, by the printer, user input to the operating switch during the specific time period after printing the pairing-related information on the paper of the roll paper; and
      not pair with the terminal when not receiving, by the terminal, user input in the specific user interface during the specific time period after printing the pairing-related information on the paper of the roll paper, and/or when not receiving, by the printer, user input to the operating switch during the specific time period after printing the pairing-related information on the paper of the roll paper.

2. The printing system described in claim 1, wherein the terminal is a table computer including the touch panel and a front.

3. The printing system described in claim 1, the touch panel of the terminal is configured to display information indicating failure of pairing in the user interface when failing to pair with the printer.

4. The printing system described in claim 1, wherein the printer prints on the paper of the roll paper based on print data when receiving the print data from the terminal paired with the printer based on Bluetooth.

5. The printing system described in claim 1, printer further comprising:
a cutter configured to cut the paper of the roll paper.

6. The printing system described in claim 1, wherein the printer is a mobile printer that is held by a user.

7. A method for controlling a printer and a terminal, the printer including a conveyance mechanism configured to convey a paper of a roll paper, a print mechanism configured to print on the paper of the roll paper, an operating switch including a feed switch for conveying the paper of the roll paper, and a wireless communicator configured to communicate wirelessly with the terminal paired with the printer based on Bluetooth, the terminal including a touch panel configured to display a user interface related to Bluetooth settings, the method comprising:
displaying, by the terminal, a device name of the printer in a selectable manner in the user interface;
displaying based on Numeric Comparison method, by the terminal, a passkey including a specific number of values for pairing with the printer based on Bluetooth in a specific user interface when receiving a selection of the device name of the printer;
printing, by the printer, pairing-related information including the passkey on the paper of the roll paper if printing by the print mechanism is possible when displaying, by the terminal, the passkey in the specific user interface after turning the printer power on;
pairing between the printer and the terminal when receiving, by the terminal, user input in the specific user interface during a specific time period after printing the pairing-related information on the paper of the roll paper, and/or when receiving, by the printer, user input to the operating switch during the specific time period after printing the pairing-related information on the paper of the roll paper; and not pairing between the printer and the terminal when not receiving, by the terminal, user input in the specific user interface during the specific time period after printing the pairing-related information on the paper of the roll paper, and/or when not receiving, by the printer, user input to the operating switch during the specific time period after printing the pairing-related information on the paper of the roll paper.

8. The method described in claim 7, wherein the terminal is a tablet computer including the touch panel on a front.

9. The method described in claim 7, the touch panel of the terminal configured to display information indicating failure of pairing in the user interface when failing to pair with the printer.

10. The method described in claim 7, wherein the printer prints on the paper of the roll paper based on print data when receiving the print data from the terminal paired with the printer based on Bluetooth.

11. The method described in claim 7, the printer further comprising:
a cutter configured to cut the paper of the roll paper.

12. The method described in claim 7, wherein the printer is a mobile printer that is held by a user.

13. A printer comprising:
a conveyance mechanism configured to convey a paper of a roll paper;
a print mechanism configured to print on the paper of the roll paper;
an operating switch including a feed switch for conveying the paper of the roll paper;
a wireless communicator configured to communicate wirelessly with a terminal paired with the printer based on Numeric Comparison method of Bluetooth pairing; and
a controller configured to control the print mechanism to print on the paper of the roll paper based on print data when receiving the print data from the terminal paired with the printer based on Bluetooth,
wherein the controller is configured to:
control the print mechanism to print pairing-related information including a passkey on the paper of the roll paper if printing by the print mechanism is possible after turning the printer power on, the passkey including a specific number of values for pairing with the terminal based on Bluetooth;
pair with the terminal when receiving user input to the operating switch during the specific time period after printing the pairing-related information on the paper of the roll paper, and/or when receiving, from the terminal, information indicating user input in a specific user interface of the terminal during the specific time period after printing the pairing-related information on the paper of the roll paper; and
not pair with the terminal when not receiving user input to the operating switch during the specific time period after printing the pairing-related information on the paper of the roll paper, and/or when not receiving, from the terminal, information indicating user input in the specific user interface of the terminal during the specific time period after printing the pairing-related information on the paper of the roll paper.

* * * * *